United States Patent
Kabalnov et al.

(10) Patent No.: US 6,997,978 B2
(45) Date of Patent: *Feb. 14, 2006

(54) MAGNETA INK-JET INKS

(75) Inventors: Alexey S Kabalnov, Corvallis, OR (US); Charles G. Dupuy, Corvallis, OR (US); Patricia A Wang, Salem, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 123 days.

This patent is subject to a terminal disclaimer.

(21) Appl. No.: 10/622,985

(22) Filed: Jul. 18, 2003

(65) Prior Publication Data

US 2005/0011402 A1  Jan. 20, 2005

(51) Int. Cl.
*C09D 11/02* (2006.01)
*C09B 45/12* (2006.01)

(52) U.S. Cl. .............. 106/31.51; 106/31.51; 106/31.52; 8/639; 8/641; 8/657; 8/658; 8/674; 8/681; 8/682; 8/684; 8/686

(58) Field of Classification Search ............ 106/31.51, 106/31.5, 31.52; 8/639, 641, 657, 658, 681, 8/682, 684, 686, 674
See application file for complete search history.

(56) References Cited

U.S. PATENT DOCUMENTS

| | | | |
|---|---|---|---|
| 5,536,306 A | 7/1996 | Johnson et al. | |
| 5,858,075 A | 1/1999 | Dearfurff et al. | |
| 6,001,161 A | 12/1999 | Evans et al. | |
| 6,053,969 A * | 4/2000 | Lauw et al. | 106/31.27 |
| 6,419,353 B1 | 7/2002 | Adamic et al. | |
| 6,521,030 B1 * | 2/2003 | Stoffel | 106/31.27 |
| 6,521,032 B1 * | 2/2003 | Lehmann et al. | 106/31.51 |
| 6,596,067 B2 * | 7/2003 | Menzel et al. | 106/31.51 |
| 6,673,140 B2 * | 1/2004 | Tyrell et al. | 106/31.5 |
| 6,808,555 B2 * | 10/2004 | Wang et al. | 106/31.43 |
| 6,824,598 B2 * | 11/2004 | Thornberry et al. | 106/31.27 |
| 6,843,838 B2 * | 1/2005 | Zimmer et al. | 106/31.27 |
| 2003/0110980 A1 | 6/2003 | Thornberry et al. | |
| 2004/0020405 A1 | 2/2004 | Wright et al. | |
| 2004/0074018 A1 * | 4/2004 | Wuzik et al. | 8/543 |
| 2004/0123772 A1 | 7/2004 | Zimmer et al. | |
| 2005/0011406 A1 * | 1/2005 | Kabalnov et al. | 106/31.49 |

FOREIGN PATENT DOCUMENTS

WO  WO 01/48090  12/2000

\* cited by examiner

*Primary Examiner*—Helene Klemanski

(57) ABSTRACT

The present invention is drawn to magenta dye blends and magenta ink-jet inks that can be used in ink sets for creating photo quality images. The dye blend can comprise a nickel-containing azo dye blended with a rhodamine dye at a 1:80 to 125:4 weight ratio.

23 Claims, No Drawings

MAGNETA INK-JET INKS

FIELD OF THE INVENTION

The present invention is drawn to the area of ink-jet imaging. More specifically, the present invention is drawn to magenta ink-jet inks that can be used in magenta-cyan-yellow ink sets.

BACKGROUND OF THE INVENTION

In general, ink-jet inks are either dye- or pigment-based inks. Both are typically prepared in an ink vehicle that contains the dye and/or the pigment. Dye-based ink-jet inks generally use a liquid colorant that is usually water-based to turn the media a specific color. Conversely, pigmented inks typically use a solid or dispersed colorant to achieve color.

Color characteristics of dye-containing inks play an important role in the quality of the printed ink-jet image. Perceived color quality can be characterized using any one of several color space systems, such as CIELAB or Munsell, as is well known in the art. With respect to Munsell color space, a given color is defined using three terms, namely Hue, Value, and Chroma. With respect to CIELAB color space, a color is defined using three terms $L^*$, $a^*$, and $b^*$. With this system, $L^*$ defines the lightness of a color, and it ranges from 0 to 100 (with 100 being white). Additionally, the terms $a^*$ and $b^*$, together, define the hue, where $a^*$ ranges from a negative number (green) to a positive number (red), and $b^*$ ranges from a negative number (blue) to a positive number (yellow). Alternate terms such as $h°$ (hue angle) and $C^*$ (chroma) can be used to further describe a given color, as is known to those skilled in the art.

There is a need to improve permanence of ink-jet produced photographs, while preserving their color vividness. There are several failure mechanisms by which ink-jet produced images can undesirably change color over time. Photographs can fade under the action of light or an atmospheric gas, or as a result of trace impurities in the air. Another failure mechanism is due to humidity causing humid color change. Prior solutions have used multiple dyes in a single ink wherein one provides good lightfastness and the other provides good chroma. Such systems in the prior art have lead to images having bright chroma and mediocre to good lightfastness on swellable photo media. Alternative, single bright dyes have been used that provide good humid-fastness and airfastness, but relatively poor lightfastness, or vice versa.

Accordingly, investigations continue into developing ink formulations that have improved properties and that do not improve one property at the significant expense of others. Many challenges still remain to further improve the image quality and lightfastness of ink-jet prints without sacrificing pen performance and reliability.

SUMMARY OF THE INVENTION

It has been recognized that it would be advantageous to develop magenta dye blends as well as magenta ink-jet inks for use with dye sets and ink-jet ink sets, respectively, that exhibit good gamut, lightfastness, airfastness, and chroma. As such, magenta dye blends and magenta ink-jet inks are provided that meet these criterion.

In one embodiment, a magenta dye blend for formulating an ink-jet ink can comprise a nickel-containing azo dye blended with a rhodamine dye. The nickel-containing azo dye to rhodamine dye weight ratio can be from 1:80 to 125:4.

Alternatively, a magenta ink-jet ink for ink-jet printing can comprise an effective amount of an ink vehicle and from 0.9 wt % to 10.5 wt % of a magenta dye blend admixed in the ink vehicle. Again, the magenta dye blend can comprise a nickel-containing azo dye and a rhodamine dye at a weight ratio from 1:80 to 125:4.

Additional features and advantages of the invention will be apparent from the detailed description which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

Concentrations, amounts, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1 wt % to about 5 wt %" should be interpreted to include not only the explicitly recited concentration of about 0.1 wt % to about 5 wt %, but also include individual concentrations and the sub-ranges within the indicated range. Thus, included in this numerical range are individual concentrations such as 1 wt %, 2 wt %, 3 wt %, and 4 wt %, and sub-ranges such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than about 5 wt %" should be interpreted to include all values and sub-ranges between 0 wt % and 5 wt %. Furthermore, such an interpretation should apply regardless of the breadth of the range or the characteristics being described.

As used herein, "effective amount" refers to at least the minimal amount of a substance or agent, which is sufficient to achieve a desire effect. For example, an effective amount of an "ink vehicle" is the minimum amount required in order to create an ink composition, while maintaining properties necessary for effective ink-jetting.

As used herein, "liquid vehicle" or "ink vehicle" refers to the liquid fluid in which colorant is placed to form an ink. Ink vehicles are well known in the art, and a wide variety of ink vehicles may be used with the systems and methods of the present invention. Such ink vehicles may include a mixture of a variety of different agents, including, surfactants, solvents, co-solvents, buffers, biocides, sequestering agents, viscosity modifiers, surface-active agents, water, etc.

The term "substantially" when used with another term shall include from mostly to completely.

With this in mind, the present invention is drawn to the area of ink-jet imaging. More specifically, the present is drawn to magenta dye blends and magenta ink-jet inks for ink-jet imaging.

The magenta dye blend for formulating an ink-jet ink can comprise a nickel-containing azo dye blended with a rhodamine dye. The nickel-containing azo dye to rhodamine dye weight ratio can be from 1:80 to 125:4.

Additionally, a magenta ink-jet ink for ink-jet printing can comprise an effective amount of an ink vehicle and from 0.9 wt % to 10.5 wt % of a magenta dye blend admixed in the ink vehicle. The magenta dye blend of the ink-jet ink can comprise a nickel-containing azo dye and a rhodamine dye at a weight ratio from 1:80 to 125:4.

With respect to either the dye blend or the ink-jet ink, the nickel-containing azo dye can be any functional dye that meets these criterion set forth above.

Specific examples, which are not intended to be limiting, are the dyes having a structure according to Formula 1 below:

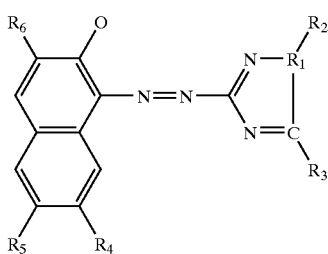

Formula 1

In such a dye the nickel to dye molecule ratio can 1:1, 1:2 or 2:2. $R_1$ can be N or C. Furthermore, $R_2$, $R_3$, $R_4$, $R_5$ and $R_6$ can be CN, COOM, $SO_3M$, H, and $SO_2NH_2$. M can be H Na, Li, K, $NH_4$, ammonium substituted alkyl and combinations thereof. The nickel-containing azo dye can be a single nickel-containing azo dye, or can be two or more nickel-containing azo dyes blended together.

One preferred embodiment of the above Formula 1 is Formula 2, which has a 1:2 nickel to dye ratio and is shown below.

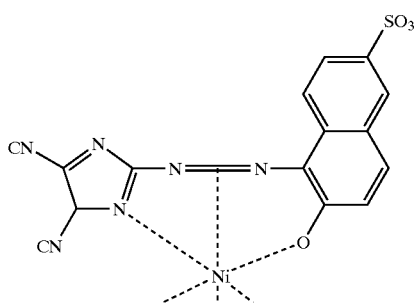

-continued

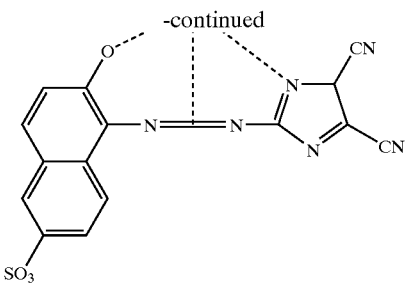

Furthermore, in Formula 2, $R_1$ is C; $R_2$ and $R_3$ are CN; $R_5$ is $SO_3M$; and $R_4$ and $R_6$ are H.

Another preferred embodiment of Formula 1 is Formula 3, which has a 1:1 nickel to dye ratio and is shown below.

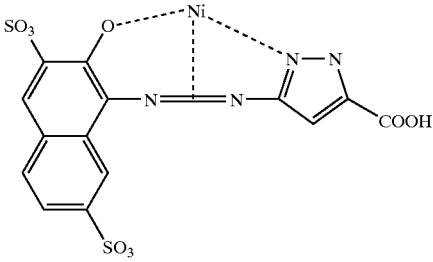

Furthermore, in Formula 3, $R_1$ is N; $R_2$ is H; $R_3$ is COOH; $R_4$ is $SO_3$; $R_5$ is H and $R_6$ is SO3.

With respect to either the dye blend or the ink-jet ink, any functional rhodamine dye can be used. The rhodamine dye can be a single rhodamine dye, or can be two or more rhodamine dyes blended together. Without limitation, examples include Acid Red 52, Acid Red 289, Acid Red 388, and mixtures thereof.

The dye blends can be used to formulate magenta ink-jet inks, which can be used with commercially available ink-jet printers, such as DESKJET™ and other similar printers manufactured by Hewlett-Packard Company. In one embodiment, if the dye blend is used to formulate a magenta ink-jet ink, then the rhodamine dye can be present in the magenta ink-jet ink at from 0.1 wt % to 2.5 wt %, and the nickel-containing azo dye is present in the magenta ink-jet ink at from 0.8 wt % to 8 wt %. These and other magenta ink-jet inks can be used with three, four, five, or six pen ink sets for producing true colors on a variety of media, including uncoated media, clay coated media, inorganic porous media, and gelatin coated media, each with improved lightfastness and gamut.

It should be noted that embodiments above and hereafter are merely provided to set forth some examples. Those skilled in the art will appreciate modifications that are also within the scope of the present invention.

A typical ink vehicle formulation that can be used with a dye set of the present invention can include one or more solvent or co-solvents, present in total at from 5.0% to 50.0% by weight, and one or more non-ionic, cationic, and/or anionic surfactant, present in total at from 0.01% to 10.0% by weight. The balance of the formulation can be purified water, and/or other vehicle components known in the art such as biocides, viscosity modifiers, materials for pH adjustment, sequestering agents, preservatives, and the like.

Classes of solvents or co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this invention may range from 0.01% to 10.0% by weight.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents such as EDTA (ethylene diamine tetra acetic acid) may be included to eliminate the deleterious effects of heavy metal impurities, and buffer solutions may be used to control the pH of the ink. From 0.001% to 2.0% by weight, for example, can be used. Viscosity modifiers and buffers may also be present, as well as other additives known to those skilled in the art to modify properties of the ink as desired. Such additives can be present at from 0.01% to 20% by weight.

Though weight percent ranges various ink vehicle components are provided, this must not imply that a particular component is an essential element. In other words, the weight percent ranges provided are meant to state that if the component is present, the weight percent range can be used.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

Ink-jet Ink Vehicles

Two ink-jet ink vehicles were formulated that work well with the magenta dye blends of the present invention. These ink vehicles can be used to form ink-jet inks in accordance with embodiments of the present invention. However, these ink vehicles are not the only ink vehicles that can be used. Tables 1a and 1b below provide two acceptable examples of ink vehicles:

TABLE 1a

Ink Vehicle 1

| Component | Amount |
| --- | --- |
| Trimethylolpropane | 7.5 wt % |
| 2-pyrrolidinone | 6.5 wt % |
| 1,5-pentanediol | 8 wt % |
| EDTA disodium salt | 75 ppm |
| Trizma base | 0.2 wt % |
| Magnesium nitrate hexahydrate | 3 wt % |
| Tergitol 15S7 | 1 wt % |
| Tergitol 15S5 | 1 wt % |
| Dowfax 83900 | 0.4 wt % |
| Water | Balance |

TABLE 1b

Ink Vehicle 2

| Component | Amount |
| --- | --- |
| Trimethylolpropane | 12 wt % |
| 2-pyrrolidinone | 6.5 wt % |
| 1,5-pentanediol | 2 wt % |
| EDTA disodium salt | 75 ppm |
| Trizma base | 0.2 wt % |
| Tergitol 15S7 | 1 wt % |
| Tergitol 15S5 | 1 wt % |
| Dowfax 83900 | 0.4 wt % |
| Water | Balance |

Example 2

Magenta Ink-jet Inks Prepared for Comparison

Eight magenta ink-jet inks (M1-M8) were prepared using the ink vehicle provided in Table 1a above, except for M7 which was mixed with the ink vehicle provided in Table 1b above. None of the nickel-containing azo dyes used in Table 2 are present in the magenta ink used with the HP970C printer sold by Hewlett-Packard Company. Specifically, M2, M3, M5, M6, and M7 represent inks containing a nickel-containing azo dye blended with a rhodamine dye, in accordance with embodiments of the present invention. The other inks were prepared for comparison purposes, including M1 and M4 which contain only a nickel-containing azo dye, and M8 which contains a H-acid dye (instead of a rhodamine dye) blended with the azo dye. The H-acid dye used is the same dye that is used in the CP1160 HP color ink-jet printer. The ink-jet inks prepared are shown in Table 2 below:

TABLE 2

Magenta dye concentrations for each ink-jet ink prepared

Dye and wt % in ink vehicle

| Ink | AR52 (rhodamine) | AR289 (rhodamine) | CP1160 magenta (H-acid) | Formula 3 (Ni-containing azo) | Formula 2 (Ni-containing azo) |
|---|---|---|---|---|---|
| M1 | — | — | — | — | 4 wt % |
| M2 | 1.2 wt % | — | — | — | 2.7 wt % |
| M3 | 0.8 wt % | — | — | — | 3.2 wt % |
| M4 | — | — | — | 5.8 wt % | — |
| M5 | 1.2 wt % | — | — | 3.4 wt % | — |
| M6 | 1 wt % | — | — | 4 wt % | — |
| M7 | — | 1.1 wt % | — | — | 2.7 wt % |
| M8 | — | — | 4 wt % | — | 2.7 wt % |
| HP970C magenta | — | — | — | — | — |

Example 3

Lightfastness, Airfastness, and Chroma Comparison

The eight ink-jet inks prepared were compared to one another, as well as to state of the art magenta ink sold with the HP970C printer by Hewlett-Packard Company. Additionally, Kodak Edge 8 AgX was used as a lightfastness benchmark for comparison purposes. The swellable media used was HP Premium Plus Photo paper. The porous media used was HP Photo paper. Table 3 below provides data retrieved after conducting this comparison:

TABLE 3

Comparison of lightfastenss, airfastness, and chroma

| Ink | Lighfastness (years to failure on swellable media) | Airfastness (days to failure on porous media) | Chroma (C* on swellable media) |
|---|---|---|---|
| M1 | 146 | 237 | 75 |
| M2 | 51 | 525 | 82 |
| M3 | 79 | — | 80 |
| M4 | 73 | 1208 | 73 |
| M5 | 23.6 | 977 | 84 |
| M6 | 29 | — | 80 |
| M7 | 16.4 | — | 79 |
| M8 | 6.4 | — | 75 |
| HP970C | 11.5 | 140 | 79 (benchmark) |
| Kodak Edge 8 AgX | 22 (benchmark) | — | — |

The "years to failure" for lightfastness was tested using the Wilhelm procedure as described in: "The Permanence and Care of Color Photographs" by Henry Wilhelm, Preservation Publishing Co., Grinell, Iowa. The inks were printed at an optical density of 0.5, and then exposed to cool white fluorescent light at intensity of 70 kLux using an Atlas HPUV fadeometer. To correct for the paper background, the background corrections with the power of 1.5 were introduced. The time to failure was estimated based on the assumption of 450 Lux exposure per 12-hour day, that is, 1971 kLux-hour per year. The time to failure was defined as the time at which 25% optical density loss was observed.

"Days to failure" for airfastness was determined using atmospheric air in Corvallis, Oreg. USA, which was blown over printed color palettes and the fade of images was monitored over time using the Wilhelm failure criteria (as used in lightfastness described above). The time to failure in hours was defined as the time at which 25% optical density loss was observed.

All of the samples were tested side-by-side. No acceleration factor due to increased air flow was introduced, and thus, the time to failure is regarded as relative, rather than as an absolute measurement.

As can be seen from Table 3 above, nickel-containing azo dyes alone (M1 and M4) have good lightfastness and airfastness, but are not bright enough when compared to the HP970C benchmark. The HP970 magenta, though bright enough to act as a benchmark with respect to chroma, is less than desirable with respect to lightfastness on swellable media and airfastness on porous media. Conversely, inks M2, M3, M5, M6, and M7, all of which include a nickel-containing azo dye blended with a rhodamine dye, provided better chroma than the benchmark HP970C, as well as provided significantly better lighfastess on swellable media and airfastness on porous media. Only ink M7 performed below the lighfastness benchmark Kodak Edge 8 AgX, though ink M7 still exhibited an improvement over the HP970C magenta ink with respect to lightfastness. Ink M8, which contained the H-acid dye blended with a nickel-containing azo dye, performed poorly with respect to lightfastness.

While the invention has been described with reference to certain preferred embodiments, those skilled in the art will appreciate that various modifications, changes, omissions, and substitutions can be made without departing from the spirit of the invention. For example, though a specific vehicle is shown for use in Example 1, other vehicles can also be used. Additionally, other inks can be used with the ink sets of the present invention for alternative applications. It is intended, therefore, that the invention be limited only by the scope of the following claims.

What is claimed is:

1. A magenta dye blend for formulating an ink-jet ink, comprising: (a) a nickel-containing azo dye, blended with (b) a rhodamine dye, said nickel-containing azo dye to rhodamine dye weight ratio being from 1:80 to 125:4.

2. A magenta dye blend as in claim 1, wherein the nickel-containing azo dye comprises a nickel metalized napthol azo triazole.

3. A magenta dye blend as in claim 1, wherein the nickel-containing azo dye comprises a dye-having the structure:

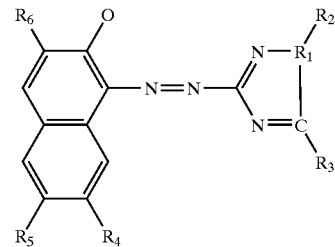

wherein the nickel to dye molecule ratio is 1:1, 1:2 or 2:2; and wherein $R_1$ is N or C; $R_2$, $R_3$, $R_4$, $R_5$ and $R_6$ are CN, COOM, $SO_3$, $SO_3M$, H, or $SO_2NH_2$; and wherein M is H, Na, Li, K, $NH_4$, ammonium substituted alkyl or combinations thereof.

4. A magenta dye blend as in claim 3, wherein the nickel-containing azo dye comprises a dye having the structure:

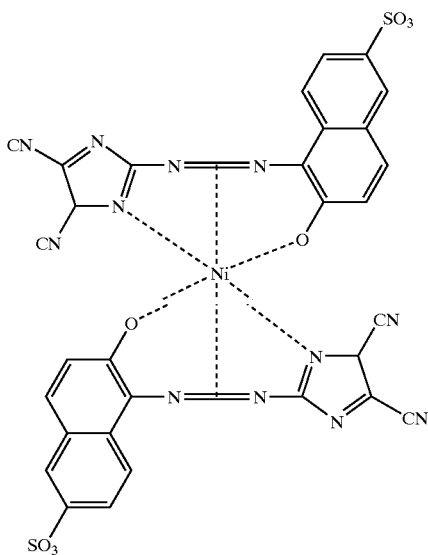

wherein the nickel to dye molecule ratio is 1:2.

5. A magenta dye blend as in claim 3, wherein the nickel-containing azo dye comprises a dye having the structure:

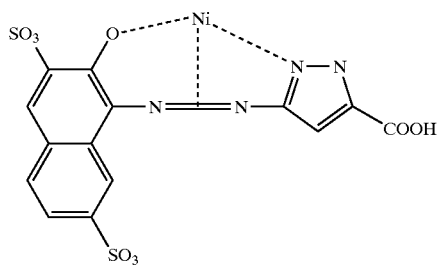

wherein the nickel to dye molecule ratio is 1:1.

6. A magenta dye blend as in claim 1, wherein the rhodamine dye comprises a member selected from the group consisting of Acid Red 52, Acid Red 289, Acid Red 388, and mixtures thereof.

7. A magenta dye blend as in claim 1, wherein the nickel-containing azo dye is a single nickel-containing azo dye.

8. A magenta dye blend as in claim 1, wherein the nickel-containing azo dye is at least two nickel-containing azo dyes blended together.

9. A magenta dye blend as in claim 1, wherein the rhodamine dye is a single rhodamine dye.

10. A magenta dye blend as in claim 1, wherein the rhodamine dye is at least two rhodamine dyes blended together.

11. A magenta ink-jet ink for ink-jet printing, comprising: (a) an effective amount of an ink vehicle; and (b) from 0.9 wt % to 10.5 wt % of a magenta dye blend admixed in the ink vehicle, said magenta dye blend comprising a nickel-containing azo dye, and a rhodamine dye at a weight ratio from 1:80 to 125:4.

12. A magenta ink-jet ink as in claim 11, wherein the rhodamine dye is present in the magenta ink-jet ink at from 0.1 wt % to 2.5 wt %.

13. A magenta ink-jet ink as in claim 11, wherein the nickel-containing azo dye is present in the magenta ink-jet ink at from 0.8 wt % to 8 wt %.

14. A magenta ink-jet ink as in claim 11, wherein the nickel-containing azo dye comprises a nickel metalized napthol azo triazole.

15. A magenta ink-jet ink as in claim 11, wherein the nickel-containing azo dye comprises a dye having the structure:

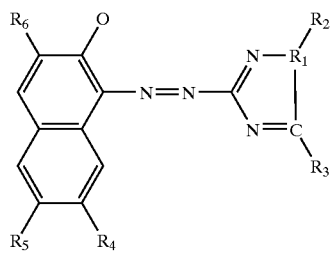

wherein the nickel to dye molecule ratio is 1:1, 1:2 or 2:2; and wherein $R_1$ is N or C; $R_2$, $R_3$, $R_4$, $R_5$ and $R_6$ are CN, COOM, $SO_3$, $SO_3M$, H, or $SO_2NH_2$; and wherein M is H, Na, Li, K, $NH_4$, ammonium substituted alkyl or combinations thereof.

16. A magenta ink-jet ink as in claim 15, wherein the nickel-containing azo dye comprises a dye having the structure:

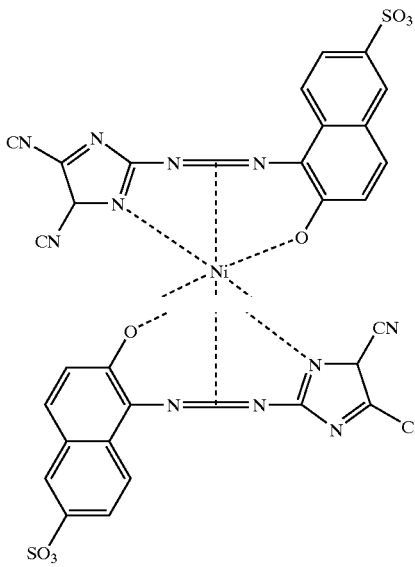

wherein the dye has a nickel to dye molecule ratio of 1:2.

17. A magenta ink-jet ink as in claim 15, wherein the nickel-containing azo dye comprises a dye having the structure:

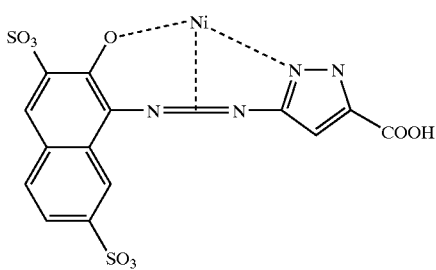

wherein the nickel to dye molecule ratio is 1:1.

18. A magenta ink-jet ink as in claim 11, wherein the rhodamine dye comprises a member selected from the group consisting of Acid Red 52, Acid Red 289, Acid Red 388, and mixtures thereof.

19. A magenta ink-jet ink as in claim 11, wherein the nickel-containing azo dye is a single nickel-containing azo dye.

20. A magenta ink-jet ink as in claim 11, wherein the nickel-containing azo dye is at least two nickel-containing azo dyes blended together.

21. A magenta ink-jet ink as in claim 11, wherein the rhodamine dye is a single rhodamine dye.

22. A magenta ink-jet ink as in claim 11, wherein the rhodamine dye is at least two rhodamine dyes blended together.

23. A magenta ink-jet ink as in claim 11, wherein the ink vehicle comprises from 5.0% to 50.0% by weight of solvent, from 0.01% to 10.0% of surfactant, and water.

* * * * *